(12) United States Patent
Storino

(10) Patent No.: US 6,775,624 B2
(45) Date of Patent: Aug. 10, 2004

(54) METHOD AND APPARATUS FOR ESTIMATING REMAINING LIFE OF A PRODUCT

(75) Inventor: Salvatore Nicholas Storino, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 173 days.

(21) Appl. No.: 10/045,911

(22) Filed: Oct. 19, 2001

(65) Prior Publication Data
US 2003/0078741 A1 Apr. 24, 2003

(51) Int. Cl.[7] .............................................. G06F 19/00
(52) U.S. Cl. ............................................ 702/34; 700/175
(58) Field of Search ......................... 702/34; 700/177, 700/90, 175; 324/158.1; 505/500; 342/200; 719/494; 73/1.34; 711/103

(56) References Cited

U.S. PATENT DOCUMENTS

| | | | |
|---|---|---|---|
| 5,251,144 A | * 10/1993 | Ramamurthi | 700/177 |
| 5,371,066 A | * 12/1994 | Pastor et al. | 505/500 |
| 5,646,540 A | * 7/1997 | Stals et al. | 324/691 |
| 5,694,132 A | * 12/1997 | Johnson | 342/200 |
| 6,035,261 A | 3/2000 | Carpenter et al. | 702/59 |
| 6,043,464 A | * 3/2000 | Berger et al. | 219/494 |
| 6,092,410 A | * 7/2000 | Kaehler et al. | 73/1.34 |
| 6,249,838 B1 | * 6/2001 | Kon | 711/103 |
| 6,411,908 B1 | * 6/2002 | Talbott | 702/34 |
| 2002/0107589 A1 | * 8/2002 | Grimm | 700/90 |
| 2003/0014150 A1 | * 1/2003 | Flanagan et al. | 700/175 |
| 2003/0030429 A1 | * 2/2003 | Kou | 324/158.1 |

FOREIGN PATENT DOCUMENTS

JP   05264371   * 10/1993

OTHER PUBLICATIONS

EIA Engineering Bulletin, SSB–1.003, Oct. 1999, "Acceleration Factors".

* cited by examiner

Primary Examiner—John Barlow
Assistant Examiner—Xiuqin Sun
(74) Attorney, Agent, or Firm—Robert R. Williams

(57) ABSTRACT

A method and apparatus are described which periodically sense environmental conditions, such as temperature, humidity, or voltage applied to a product, and apply these sensed measurements to models of ageing acceleration. Acceleration factors from the models are accumulated in nonvolatile storage. The accumulated effective aging of the product is displayed to the owner or prospective customer in various desired formats, such as effective age, current acceleration factor, estimate of effective life used, or estimate of remaining life left in the product. A warning can be sent to the user to indicate that the product's effective life is over or is nearly over.

6 Claims, 7 Drawing Sheets

METHOD AND APPARATUS FOR ESTIMATING REMAINING LIFE OF A PRODUCT

FIELD OF THE INVENTION

This invention relates to reliability of a product, and in particular to estimating the remaining lifetime of the product, using environmental and use condition history of the product, together with wearout, or aging, acceleration factors applicable to the environmental factors and use conditions.

BACKGROUND OF THE INVENTION

All products are subject to wearout. Television sets, computers, automobiles, lasers in communication equipment, military equipment, and many other products will eventually fail due to use and environmental conditions in which they are placed. Abnormally severe environmental conditions will accelerate the wearout of the products.

The current owner of such a product is interested in how much remaining life there is left, so the owner can make decisions about when to apply maintenance, whether to upgrade, and when to dispose of the product.

Another party interested in the remaining life of a product is a person considering purchase of a used product. Used computers, for example, often are difficult to sell because potential purchasers have no way of knowing how much the computers have been used, coupled with the environmental conditions in which that use took place.

There are a number of existing methods of providing, to some extent, information that assists either or both of the mentioned interested parties in assessing the age or condition of the product. For example, automobiles have odometers, which displays the distance the vehicle has been driven. The model year of the automobile allows age of the vehicle to be known. Farm tractors display "engine hours" in order to at least inform the interested parties how long the tractor has been operated. Some modern automobiles have sensors in the engine to report the condition of the engine oil, allowing maintenance to be performed when needed.

There are a number of known methods that relate aging, or wearout rates, to environmental use conditions. These methods are widely used in various industries to accelerate failures for purposes of burn-in of product. The semiconductor industry, for example, commonly operates semiconductor chips at an elevated temperature and/or an elevated voltage prior to shipment of the chips in order to weed out "early fails", also known as "infant mortality" in the chips. In the burn-in procedure, parts that would have failed within a short time after shipment (weeks or months) are caused to fail at the manufacturer's site, therefore resulting in a far more reliable product as seen by the customer.

EIA Engineering Bulletin SSB-1.003, "Acceleration Factors", published by the Electronic Industries Alliance, describes several acceleration factors.

Thermal acceleration effects are accurately modeled by the Arrhenius acceleration factor, which states:

$Af = \exp(Ea/k*(1/Tu - 1/Tt))$

Where
Af=acceleration factor; Ea=activation energy in electron volts (eV); k=Boltzman's Constant; Tu=use temperature in degrees Kelvin; Tt=test temperature in degrees Kelvin.

As can be seen, for a fixed activation energy, acceleration is quite sensitive to temperature. For example, for metal electromigration on semiconductor chips, an activation energy of 0.6 is typical. If a chip is operated at 100 degrees Centigrade, versus 90 degrees Centigrade, electromigration will be accelerated by approximately a 1.67 factor. Even relatively short times at unusually high temperatures will significantly accelerate thermal wearout mechanisms and therefore detract from the normal life of the product.

Another estimate of an environmental acceleration factor as described in the EIA Engineering Bulletin SSB-1.003 is the Hallberg-Peck acceleration factor that considers humidity effects. Hallberg-Peck includes the Arrhenius factor to account for temperature, but multiplies that acceleration factor by the cube of the ratios of relative humidity, that is:

$Af = (RHt/Rhu)^3 *$(Arrhenius acceleration factor)

Where Af is the Hallberg-Peck acceleration factor; RHt is the test environment relative humidity; RHu is the use environment relative humidity; the Arrhenius acceleration factor is as described earlier. SSB-1.003 goes on to provide further details and variations on the Hallberg-Peck acceleration factor.

SSB-1.003 also describes the Coffin-Manson acceleration factor, which is a common method to model the effects of low-cycle fatigue caused by thermal stressing upon microcircuit and semiconductor package reliability. The Coffin-Manson acceleration factor is:

$Af = (\Delta Tt/\Delta Tu)^m$

Where Af is the acceleration factor; $\Delta Tt$ is the thermal cycle temperature change in the test environment; $\Delta Tu$ is the thermal cycle temperature change in the use environment; and m is a constant, derived from empirical data. This equation predicts that thermo-mechanical failures are greatly accelerated if the temperatures excursions are larger than expected during thermal cycles.

Many other models exist in the literature that characterize how various environmental conditions affect wearout of products. Complementary Metal Oxide Semiconductor (CMOS) Field Effect Transistor (FET) devices have wearout rates that are highly dependent upon operational voltage applied, and a model sensitive to an exponential of that voltage is used to estimate wearout acceleration caused by unusually high voltage.

It should be noted that although the above models provide estimates for wearout acceleration, actual time of failure at a fixed environmental condition has a significant statistical uncertainty. For example, suppose that, in the electromigration case above, a product might be expected to last between 8 and 12 years at 90 degrees Centigrade. At 100 degrees Centigrade, it would be expected to last between $8/1.67$ years and $12/1.67$ years, or 4.8 years to 7.2 years.

Existing products lack a mechanism to provide an indicator of how much of a product's expected life has been used, incorporating environmental factors and acceleration models utilizing those factors. Neither an estimate of remaining life under such considerations, nor even a simple display of an accumulated acceleration indicator is provided by current art.

Therefore, a need exists to provide an indicator of how much of a product's expected life has been used, taking into consideration the environmental conditions in which the product has been operated.

SUMMARY OF THE INVENTION

A principal object of the present invention is to provide a user or a potential purchaser of a product with an indication of how much of the product's expected life remains.

In brief, a method and apparatus are provided which senses one or more environmental conditions, inputs those sensed values into one or more age acceleration models, and accumulates outputs of those models over time as a time integration of the age acceleration factors, resulting in an effective age of the product. These accumulations are made available to the user or prospective purchaser in several ways.

In one embodiment, the acceleration factors are simply displayed. In another embodiment, the effective age of the product is displayed normalized to the age of the product in a specified environment. In yet another embodiment, a warning is provided that, with some probability level, the product is likely to fail, or will be likely to fail in the near future, based on how long the product has been used, and under the environmental conditions the product's use has occurred. In still another embodiment, one or more indicators of a percentage of the product's expected life that has been used is displayed, considering the environmental conditions in which the product has been used.

DETAILED DESCRIPTION OF THE PREFERRED EMBODIMENTS

Figure 1:
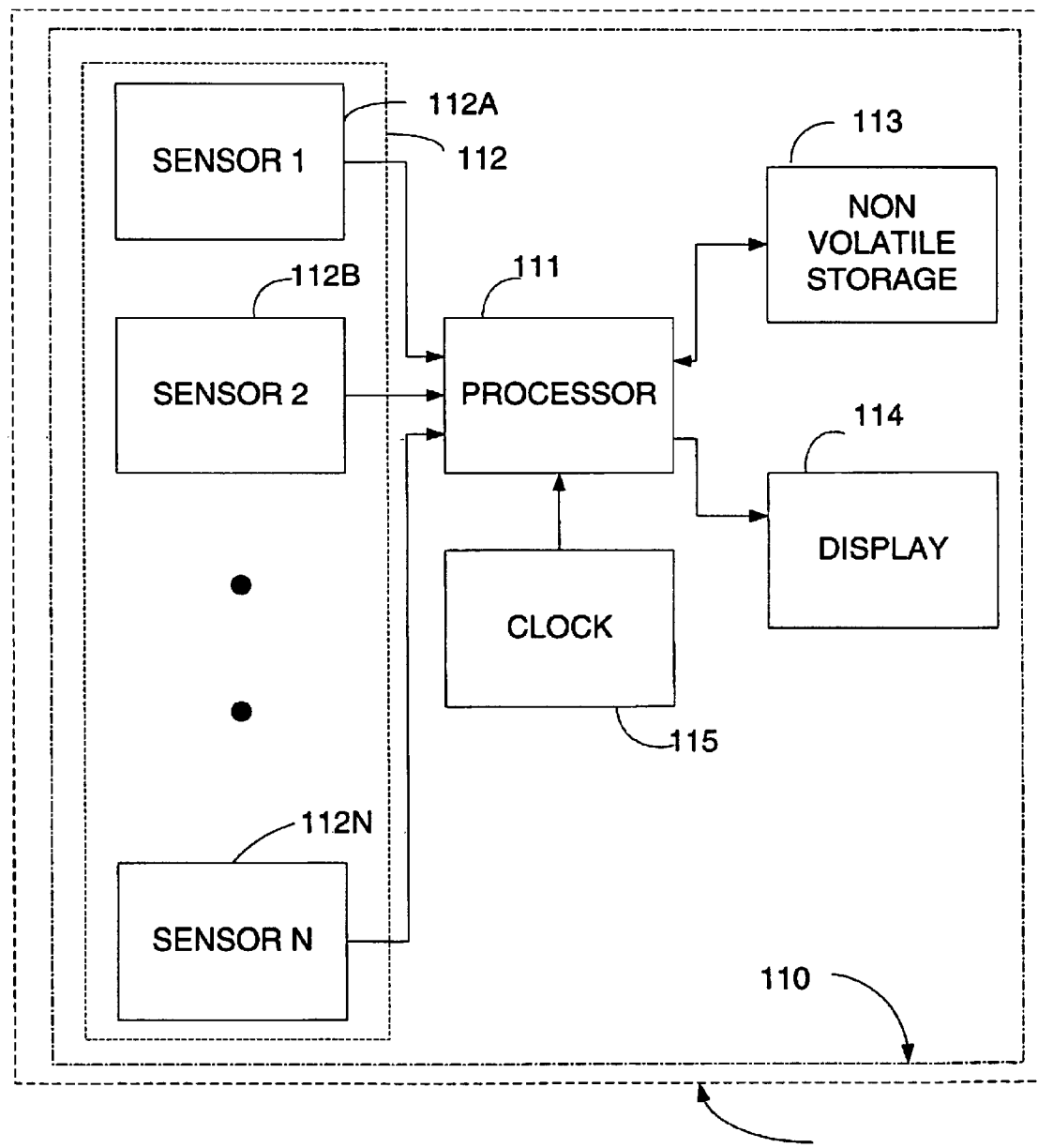
FIG. 1 is a block diagram showing a processor in communication with environmental sensors, as well as a nonvolatile storage, a display, and a clock.

With reference now to the figures, and in particular with reference to FIG. 1, there is depicted a high-level simplified block diagram of an exemplary product 100 utilizing an embodiment of the invention, age processor 110. Product 100 can be any arbitrary product for which information about effective age is desired, and, for example, can be a laptop computer, a digital camera, a video camera, an automobile, or a space vehicle, or part thereof.

Product 100 is equipped in the example with an embodiment of the invention 110, comprising a group of sensors 112, a processor 111, a nonvolatile storage 113, a display 114, and a clock 115. Sensor group 112 is shown to comprise a number of sensors 112A, 112B, and 112N. The number of sensors in sensor group 112 is arbitrary, and can be a single sensor or many sensors. The sensors in sensor group 112 can all be different, monitoring different environmental conditions, such as temperature, humidity, voltage, and thermal cycle information. A number of sensors in sensor group 112 can be the same, monitoring a condition, perhaps temperature, at different places in product 100. For example, Sensor 112A and sensor 112B might be temperature sensors in a laptop computer, with sensor 112A being located near a processor chip, and sensor 112B being located near a hard disk drive. In the example, sensor 112N might be a humidity sensor.

The outputs of the sensors 112 are shown being electrically coupled to a processor 111. Processor 111 can be a specialized processor, perhaps designed on an Application Specific Integrated Circuit (ASIC) semiconductor chip, or can be an off the shelf, readily available processor chip well-known in the art.

Nonvolatile storage 113 can be any device that retains information even when power is shut off. Examples of such devices include "Flash" memory, commonly used in digital cameras, magnetic disk storage, or ferroelectric memory devices that are currently available, for example, from Ramtron Corporation. Such devices are commonly separate from the processor, but in some forms can be on the same chip as the processor, especially in the case of ferroelectric memory or flash memory. Nonvolatile storage 113 stores such items as total age of the product and effective age, or ages, of the product as will be described below. Storage of the program itself, and any constants or parameters needed by the program, would also be stored in nonvolatile storage, although they can be copied to conventional dynamic random access memory (DRAM) or static random access memory (SRAM) during normal operating times when electrical power is available. Other forms of nonvolatile memory include, but are not limited to, hard disks, floppy disks, and magnetic tapes. Volatile memory is memory that loses stored information when power is removed from the memory. Some examples of volatile memory include DRAM and SRAM. It is also well-known that DRAM and SRAM memory are equivalent to nonvolatile memory if suitable battery backup is provided.

Display 114 can be any mechanism that will communicate to an interested party information created by age processor 110. Liquid Crystal displays (LCDs), Cathode Ray Tubes (CRTs), warning lights, and Light Emitting Diodes (LEDs) are some of the common forms of displays.

Clock 115 is a digital clock of known frequency that is electrically coupled to processor 111. Clock 115 can be the normal system clock that processor 111 uses to control its internal processing, or clock 115 can be a separate input to processor 111. The process of computing age requires a clock of known frequency to update aging values, as will be described later.

In general, environmental sensors measure a condition, such as temperature, and produce an analog output. Analog to digital converters (ADCs) are used to produce a digital representation of the analog output. Processor 111 is a digital processor and requires such conversion. ADC functions can be considered to be included in each of sensors 112A, 112B, and 112N. Alternatively, analog signals from sensors 112A, 112B, and 112N can be switched, one at a time, through an analog multiplexer (not shown), into a single ADC, with the resultant digital representation for the instant analog signal sent to processor 111.

Processor 111 receives data from a sensor 112A, 112B, or 112N, and applies that data to an algorithm known to model aging effects of the environmental condition which the instant sensor is measuring. The algorithm will produce an acceleration factor. Acceleration factors are usually normalized to some specified environmental condition. For example, a product may have a 70 degree Centigrade temperature condition specified as the condition for which its expected life has been calculated. Effective aging is often normalized to that specified condition. Consider a situation where, due to operation at an elevated temperature, aging is occurring at a rate 20% faster than aging would occur at the specified condition. The normalized aging rate would be normalized to 1.2. If environmental conditions are less severe than the specified condition, effective aging would be slower than expected from just keeping track of the elapsed hours, often called "wall clock" time, and in such a case, the normalized aging rate might be, for example, 0.7.

The acceleration factors produced by the models provide an estimate of the rate that aging is occurring. For example, normal "wall clock" aging occurs at one hour per hour. An acceleration factor of "2" means that aging is effectively occurring at two hours per hour. Simple "wall clock" age is the simple accumulation of one hour for every hour of time that passes. Effective age must account for the acceleration factor. If the acceleration factor were a constant "2" hours per hour, effective age would accumulate at two hours for each hour of time that passes. If the acceleration factor were a constant "3" hours per hour, effective age would accumulate at three hours for each hour of time that passes. In practice, the acceleration factor is not a constant, but rather, changes as temperature, humidity, voltage, or other environmental factors change during the use of the product. The estimation of effective age in practical applications is accomplished by accumulating, on known time intervals, numbers indicative of the current age acceleration factor. Those skilled in the art will recognize this as a time integration of the rate of aging, resulting in effective age.

As described earlier, the Arrhenius equation is broadly used to model aging rates caused by temperature. Processor 111 can have the Arrhenius equation included in the set of instructions, or program, that processor 111 executes. The activation energy and specified temperature applicable to each usage of the Arrhenius equation would be stored with the program, or alternatively, stored in tables of data used by the program. Obviously, well-known table lookup techniques can be utilized in the program instead of use of equations. Other aging models were presented earlier and can easily be programmed into and executed by processor 111. Still other aging models are known in the industry, or even will be developed in the future, and such models can be programmed in and executed by processor 111 currently or when they are developed. Processor 111 can compute the actual age of the product, the normalized age of the product, or the current effective rate of aging relative to the actual aging of the product. If an expected lifetime is specified by the product manufacturer, based on some specified conditions, processor 111 can compute what fraction of that time has been actually used, or effectively used, given the effective aging of the product. Alternatively, the information can be stored and/or presented as how much time does the product have left before it is likely to be worn out.

Some acceleration factors, such as Hallberg-Peck, require data on more than one environmental condition. A sensor, such as sensor 112A, can be thought of as a sensor that returns all the data required for a particular acceleration model. Thus, a sensor 112A providing data for a Hallberg-Peck model would return both humidity information and temperature information. In practice, such a sensor 112A would comprise a humidity sensor and a temperature sensor, and would simply report both data when polled by processor 111. Processor 111 can also be readily programmed to use data from multiple sensors in sensor unit 112 to get data about more than one environmental condition.

FIG. 2A through FIG. 2E depict exemplary tables of data that processor 111 can store as aging data into nonvolatile storage 113. The number of elements in the tables is dependent on the number of sensors 112 that have been implemented. The exemplary tables of FIG. 2A through FIG. 2E are illustrative of data that can be stored in nonvolatile storage 113 in the example of FIG. 1. For descriptive purposes, data in table elements with references ending in "A, B, or N" would correspond to sensors with references "A, B, or N" respectively. For example, table elements 201A, 202A, 203A, 204A, and 205A would contain data related to a measurement by sensor 112A.

Figure 2A:
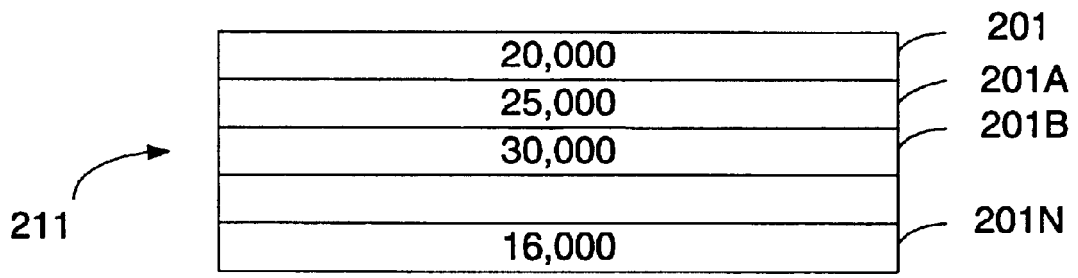
FIG. 2A shows a table that can be stored in nonvolatile memory, containing total time units, as well as effective time units computed from input from each of the sensors.

FIG. 2A shows table 211, in which numbers, or elements, indicative of total age, or effective age, are stored. Table element 201, for example, can be "wall clock" time units, that is, how many hours the product has been active. Wall clock time is not a function of any of the sensors 112. The value of table element 201A is shown to be larger than the value of table element 201 to indicate that some environmental factor, as measured by sensor 112A, has caused effective age as accumulated in element 201A to be larger than would be expected from a simple accumulation of "wall clock" hours. Similarly, the value of element 201B is shown as an even larger number, perhaps the result of an even more severe environmental condition as measured by sensor 112B. On the other hand, the value of table element 201N is less than the value of element 201, thereby indicating that that environmental condition has been less severe, as measured by sensor 112N, than the specified environmental condition.

Figure 2B:
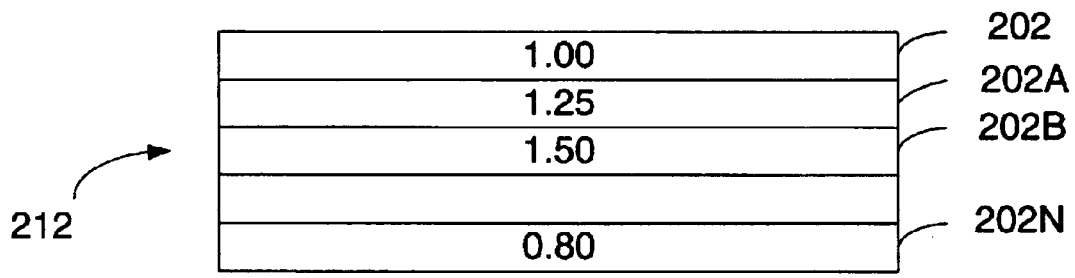
FIG. 2B shows a table that can be stored in nonvolatile memory, containing normalized age of the product, as computed from input from each of the sensors.

FIG. 2B shows table 212, in which the numbers in table 211 are normalized to the number in table element 201. Table element 202 will therefore always be "1", and can be simply a hard coded "1". Table element 202A in the example would be the value of element 201A divided by the value of element 201, that is, $25,000/20,000$, or 1.25. This would tell the user that, as far as this measured environmental factor is concerned, the effective age is 1.25 times that of a simple "wall clock" age. Likewise, element 202B would be 1.50. Continuing the example, element 202N is 0.8, indicating that the effective age of the product, as estimated from sensing and modeling that environmental condition, is lower than the effected age expected under the specified conditions.

Figure 2C:
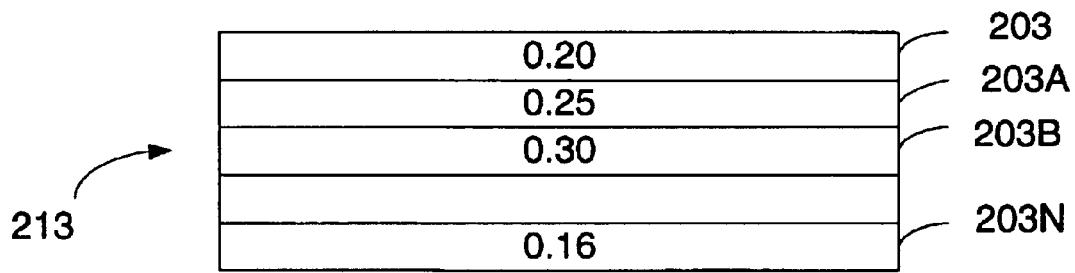
FIG. 2C shows a table that can be stored in nonvolatile memory, containing values indicative of what fraction of product lifetime has been used, as computed from input from each of the sensors.

FIG. 2C shows table 213, in which fractions of expected life of a product are stored. In this example, 100,000 hours are specified as the expected life of the product, under a set of specified environmental conditions. Again using the exemplary actual and effective hours of table 211, element 203A shows that 0.25, or 25% of the expected life of the product has been used. This was computed by dividing the 25,000 effective hours by the 100,000 expected hours. Continuing the example, element 203B indicates that, effectively, 30% of the expected life has been used, given the environmental conditions resulting in this table entry. Element 203N shows that only 16% of the expected life of the product has been used.

Figure 2D:
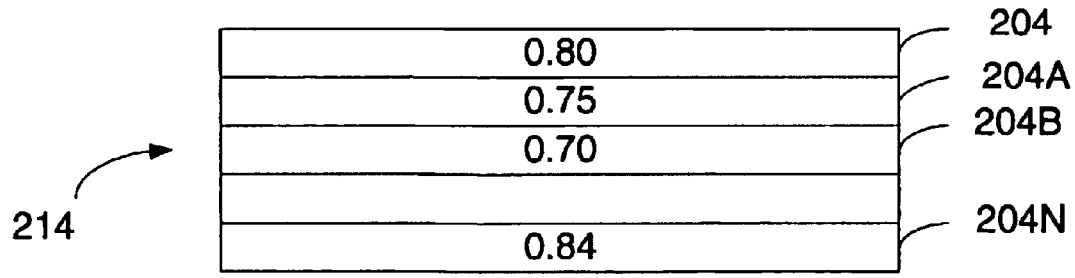
FIG. 2D shows a table that can be stored in nonvolatile memory, containing values indicative of estimated product lifetime remaining, as computed from input from each of the sensors.

FIG. 2D shows table 214, in which fractions of expected life of a product remaining are stored. The values in this table are computed exactly as were the values in table 213, except that they are subtracted from 1.0 to convert to life remaining from life used.

Figure 2E:
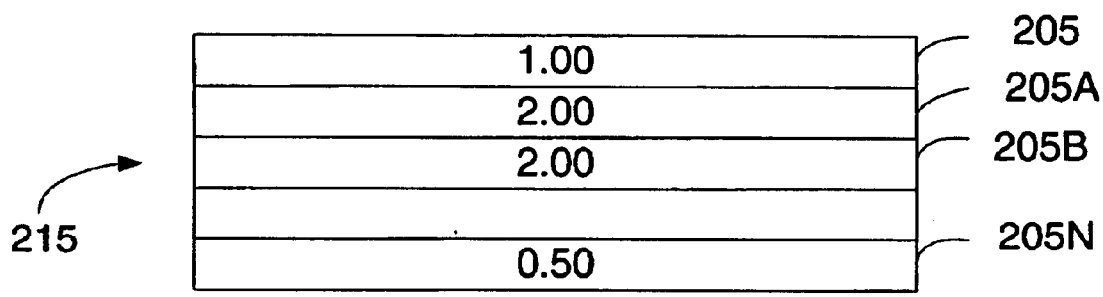
FIG. 2E shows a table that can be stored in nonvolatile memory, containing "instantaneous" acceleration factors, as computed from input from each of the sensors.

FIG. 2E shows table 215, in which numbers indicative of current rate of aging is stored. Continuing the example of table 211, element 205 would always be "1", that is, indicative of the rate of "wall clock" time. Element 205A shows that the aging rate of the condition associated with this element is currently aging the product at a rate 2.0 times the rate expected if the specified conditions were present. This might be very valuable information to a user, who can take immediate action to make improvements in the environmental condition causing the rapid aging. The user might choose to power down the product if an environmental condition becomes too harsh. Alternatively, processor 111 might be electrically coupled to a power control on the product and automatically cause the product to shut down should an environmental condition become too harsh as determined by current aging as indicated by one or more of the acceleration models' calculations from sensor 112 inputs.

Figure 3A:
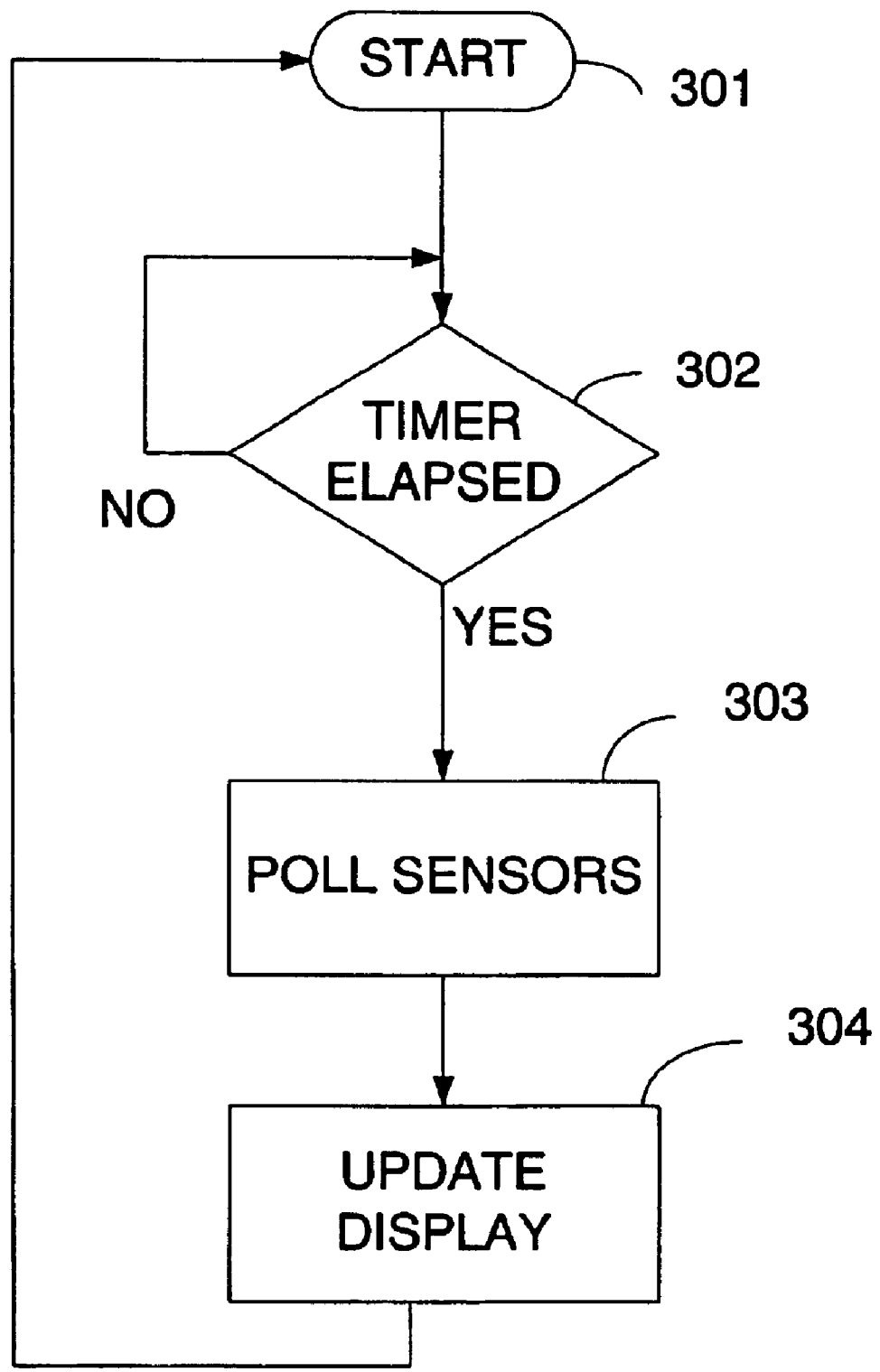
FIG. 3A is a high level flow chart showing high level flow control of the polling of the sensors, and updating the display.
Figure 3B:
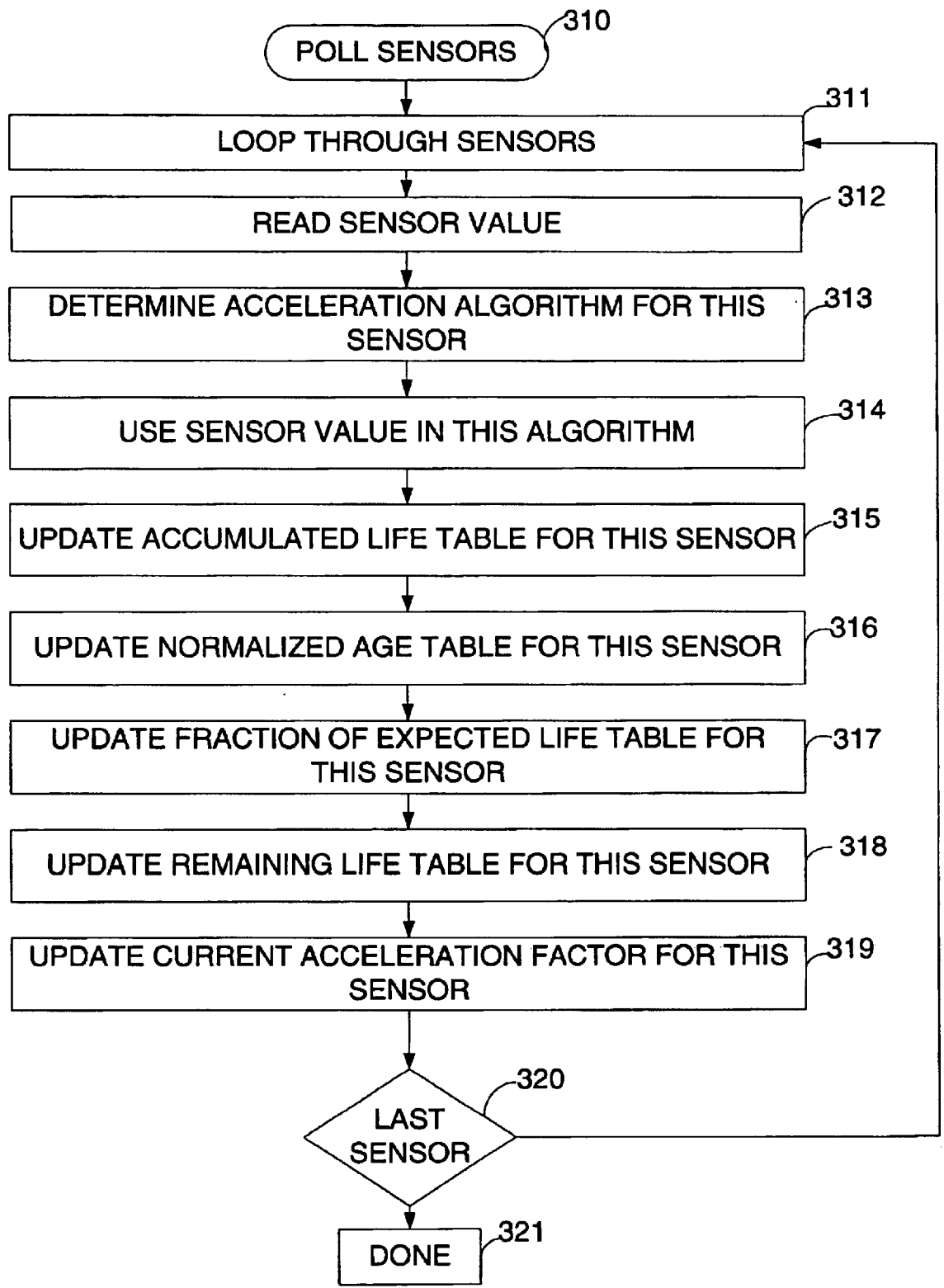
FIG. 3B is a flow chart showing a process for polling the sensors, using models to determine acceleration factors, and updating the tables identified in FIGS. 2A–2E.
Figure 3C:
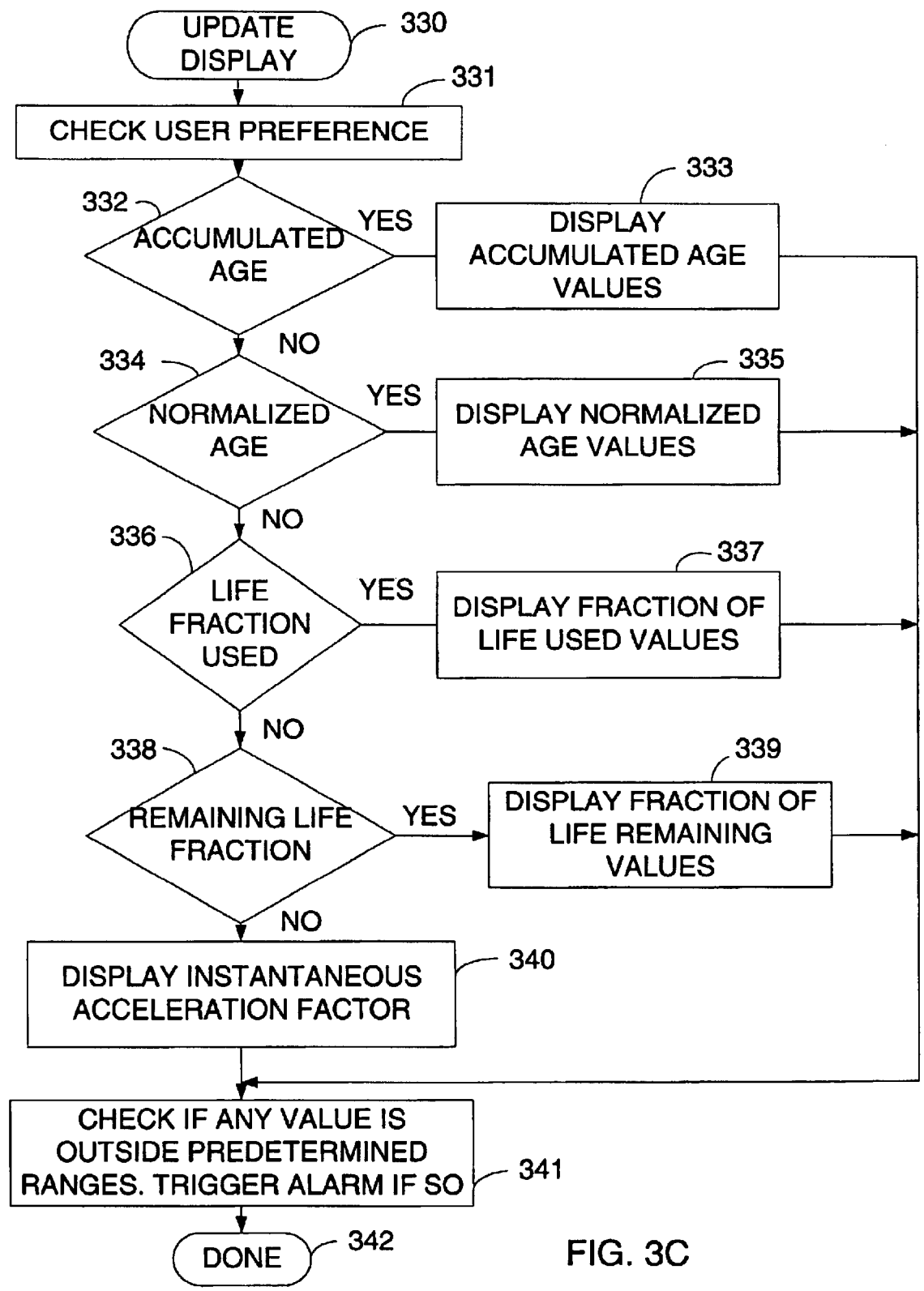
FIG. 3C is a flow chart showing a process for displaying selected information that is contained in the tables identified in FIGS. 2A–2E.

FIGS. 3A, 3B, and 3C collectively show steps of a method that, when programmed and subsequently executed by processor 111, will periodically poll the sensors 112, compute an acceleration factor for each environmental condition sensed, and update tables 211, 212, 213, 214, and 215. The tables described are exemplary. Not all the tables need to exist. Other tables holding data that can present the aging factors in different manners are contemplated; however, the tables described serve to explain the process.

FIG. 3A depicts a high-level flow control wherein control will be passed to the processes described in FIG. 3B (poll sensors) and FIG. 3C (update display) on a periodic basis. The length of the period is arbitrary, and can be one second, one minute, or one hour. In general, choice of time period would depend upon how rapidly environmental conditions would be expected to occur. Humidity, for example, would be expected to change slowly, and therefore, would not need to be sensed frequently. Temperature can change more rapidly. Rapid temperature rise occurs when a laptop computer leaves a hibernation mode and enters an active mode. Rapid temperature changes can occur if a product, such as a digital camera or a laptop computer is placed in the trunk of an automobile on a sunny day. Although FIG. 3A shows control passing to poll the sensors periodically, based upon a single timer, an obvious variation would include creating a separate timer for each sensor and receiving data from each sensor when it's individual interval has expired. The timer can be an external timer (not shown) checked by processor 111 periodically, or which interrupts processor 111 periodically. The timer can alternatively be an internal timer within processor 111, perhaps simply counting pulses from clock 115.

Block 301 is simply the starting point for the method, and passes control to block 302, which checks the timer to see if the predetermined period has elapsed. If not, control remains at block 302; if so, control passes to block 303, which comprises the steps described in FIG. 3B to poll the sensors. Upon completion of the process steps of block 303, control passes to block 304, which comprises the steps described in FIG. 3C to display the aging results, and to activate a warning if one or more aging results are not within predetermined bounds. Upon completion of the steps of block 304, control is returned to block 301, which repeats the control flow.

FIG. 3B shows a detailed block diagram of the "poll sensors" step 303 of FIG. 3A, including the steps of reading the sensors, computing age acceleration factors, and updating the aging table elements.

Block 310 is simply the starting point of the process to poll sensors, and transfers control to block 311. Block 311 is the beginning of a loop that iterates through the sensors, one sensor at a time. In a simple, one-sensor, implementation, a loop would not be required and block 311 would not be required; control would pass directly from block 310 to block 312.

Block 312 reads the value of the instant sensor. Depending on the details of the physical implementation (FIG. 1 is one such implementation), reading the instant sensor can entail reading a unique input port into the processor, such as shown in FIG. 1. In other embodiments, such as the single ADC embodiment described earlier, the processor can send out control signals to the analog multiplexer and subsequently read the output of the single ADC. Block 312's function is to perform whatever requirements the chosen embodiment imposes to read the data as sensed by the instant sensor.

Block 313 determines the proper age acceleration algorithm to use with the instant sensor. In a simple, one-sensor embodiment, only one such algorithm would be included in the program executed by processor 111. In a more general case, block 313 would use information in the program or in tables placed there by the programmer to determine the proper algorithm. Some common algorithms known to accurately model age accelerations were listed above, such as Arrhenius, Coffin-Manson, and Hallberg-Peck. Other algorithms are known to model other environmental factors, such as voltage. Any algorithm that models age acceleration is to be considered within the spirit and scope of this invention.

Once block 313 has determined the proper algorithm for the instant sensor, control is passed to that algorithm by means of a branch, a subroutine call, or other well-known programming technique to that algorithm, along with data and constants, or pointers to the data and constants, needed to execute the algorithm. The algorithm is executed in block 314, which results in an aging acceleration factor for this sensor's current environmental condition.

Block 315 updates the accumulated life table for the instant sensor depicted in FIG. 2A. Referring back to table 211, and assuming the units are in hours, assuming an hourly poll, and an acceleration factor of "2" just computed by the algorithm for the environmental condition of sensor 112A, table element 201A would have the value "2" added to the value in table element 201A. Accumulating or adding the acceleration factor on a fixed periodic basis effectively time integrates the acceleration factor, resulting in an effective age value. Table elements can be stored as integers or as floating point values.

Block 316 updates the normalized age table 212 for the instant sensor. In the current process embodiment, block 315 has just been performed, so that, for example, table element 202A can be computed as the ratio of table element 201A divided by table element 201, when sensor 112A is the instant sensor. Table element 201B can be computed as the ratio of table element 201B divided by table element 201, when sensor 112B is the instant sensor.

Block 317 updates table 213 for fraction of expected life used. The table element for the instant sensor in this table would be the ratio of the current effective life used estimated by the current sensor to the expected life of the product under the specified conditions. Considering the case where sensor 212A is the instant sensor, and 100,000 hours is the expected life under the specified conditions, table element 203A is updated by the ratio of table element 201A, which is an estimate of the product's effective age, using data from sensor 112A, divided by 100,000. A similar computation and table update occurs as each sensor becomes the instant sensor.

Block 318 updates table 214 for fraction of expected life remaining. Elements in this table are simply "1" minus the corresponding table element in the table 213. In table 213, table element 203A is 0.25; therefore table element 204A would be 0.75.

Block 319 updates the current age acceleration factor for the instant sensor. FIG. 2E shows table 215 element 205A to be 2.00, per the discussion of block 315. This value means that, according to the algorithm, using data from sensor 112A, that the product is aging at twice the rate it would under the specified conditions.

Block 320 tests to see if all sensors have been polled. If so, control passes to block 321, which marks the completion of the poll sensors process steps, and returns control back to block 303 for further control transfer to block 304. If additional sensors need to be read, block 320 passes control to block 311, which selects another sensor as the instant sensor and continues the loop. If only a single sensor exists in the system, block 320 is unnecessary and control would simply pass from block 319 to block 321.

Block 330 in FIG. 3C begins the update display function shown at high level as block 304.

Block 331 checks for user preference regarding which data to display to the user. Although subsequent blocks simply display data from one table of aging information described above, the program could easily display data from all tables, or data for one sensor across all tables. The flow is exemplary only, and is not intended to be limiting. User preferences can be entered into aging system 110 in any of a number of well-known ways, such as by keyboard (not shown), buttons (not shown), or selecting from menus presented on display 114.

Block 332 checks to see if the user preference is to display accumulated age data from table 211. If so, table elements from table 211 are displayed on display 114 by block 333, with control then passing to block 341.

If block 332 determines that the user preference is not to display accumulated age data from table 211, control passes to block 334, which checks to see if the user preference is to display normalized age data from table 212. If so, table elements from table 212 are displayed on display 114 by block 335, with control then passing to block 341.

If block 334 determines that the user preference is not to display normalized age data from table of 212, control passes to block 336, which checks to see if the user preference is to display life fraction used from table 213. If so, table elements from table 213 are displayed on display 114 by block 337, with control then passing to block 341.

If block 336 determines that the user preference is not to display life fraction used data from table 213, control passes to block 338, which checks to see if the user preference is to display life fraction remaining from table 214. If so, table elements from table 214 are displayed on display 114 by block 339, with control then passing to block 341.

If block 338 determines that the user preference is not to display life fraction used data from table 214, control passes to block 340, which displays table elements from table 215 on display 114, with control then passing to block 341.

Block 341 compares all table elements, or perhaps a predetermined subset of table elements, from any or all tables against predetermined ranges for those elements, and triggers an alarm if one or more values are outside the predetermined range for those values. The alarm can be an audible alarm sounded on a bell or buzzer (not shown), a message printed on a printer (not shown), or a message displayed on display 114, alerting the user that one or more values have exceeded predetermined bounds. Perhaps the product has exceeded its expected lifetime, according to one or more of the aging models. If so, the user may wish to purchase spare parts or to consider replacement of the product. If a current aging acceleration factor is very high, the user can respond to the alarm by taking action to improve one or more environmental conditions.

Block 342 marks the end of the update display process. Control is passed back to block 304, which then passes control to block 301.

Figure 4A:
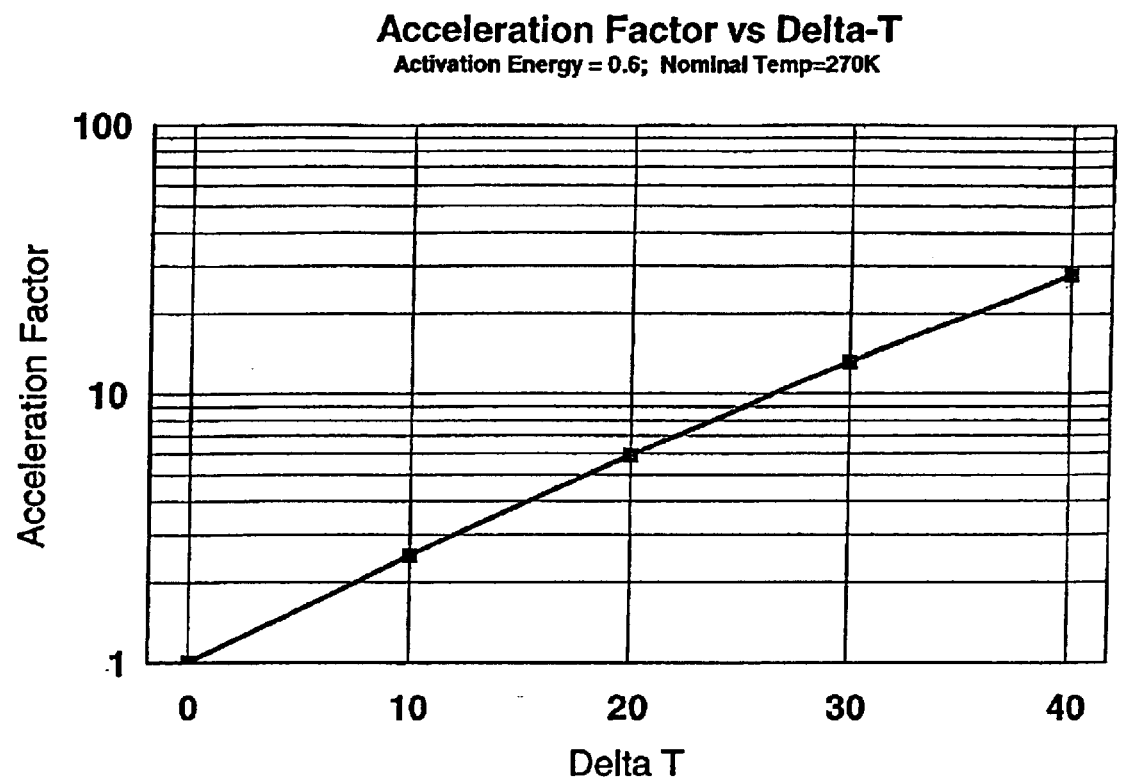
FIG. 4A is a graph of an acceleration factor plotted on a logarithmic scale, versus a temperature change, according to the Arrhenius model.

FIG. 4A shows a graph of the Arrhenius equation acceleration factor, plotted on a logarithmic scale on the y-axis versus a temperature difference from a specified temperature on the x-axis. The temperature difference is called "Delta T". Activation energy is 0.6 eV; the specified temperature is 270 degrees Kelvin. The acceleration factor is seen to be almost linear on the logarithmic scale, meaning that it is nearly exponential on a linear scale.

Figure 4B:
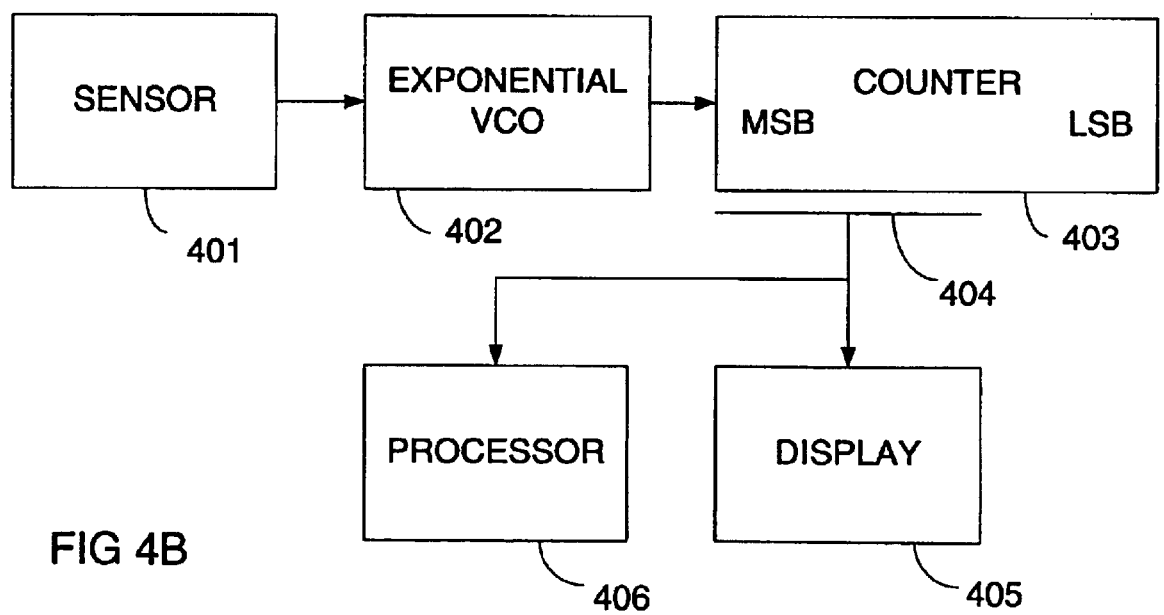
FIG. 4B is a schematic of an alternative embodiment of the invention, wherein evaluation of an acceleration factor is determined by an exponential Voltage Controlled Oscillator (VCO) instead of by a processor. A counter receives the output of the VCO and accumulates an estimate of effective age of the product.

FIG. 4B shows an embodiment of the invention wherein a digital processor is unnecessary, although a digital processor can still be utilized. The system of FIG. 4B makes use of the virtually exponential nature of the Arrhenius equation within a reasonable temperature range, and produces a value in a counter indicative of effective age per the Arrhenius equation.

Sensor 401 is a temperature sensor, with an analog voltage output. Sensor 401 produces a voltage that varies linearly with temperature. Such devices are well-known in the art. Exponential Voltage Controlled Oscillator (VCO) 402 is a VCO that produces a frequency output that varies exponentially with a linear change in input voltage. Such devices are also well known in the art. Such VCOs typically have gain and offset controls. Gain control to the VCO is used to provide the proper slope of the logarithmically linear response. This would represent the effect of the activation energy of the device being modeled. Offset control of the VCO would bring the output frequency to some known value at the specified temperature. In FIG. 4A, acceleration factor is shown as "1" when "Delta T" is zero, that is, when the temperature is 270 degrees Kelvin in the graph. "1"is just a normalized number, representing some known frequency when the temperature is at 270 degrees Kelvin.

The output of the exponential VCO 402 is electrically coupled to a counter 403. Counter 403 is implemented, at least partially, in a nonvolatile technology or is provided with a battery backup. Counter 403 has a number of bits suitable to count the number of cycles from VCO 402 during the life of the product. The counter has a "Least Significant Bit" (LSB) and a "Most Significant Bit" (MSB). The LSB toggles every cycle of the VCO's output. The MSB only changes once, unless an overflow of counter 403 occurs, which would be very undesirable. Counter 403 should be implemented with enough bits such that overflow will not occur. Selector 404 couples a number of bits of counter 403 to a display, and, optionally, a processor 406. Selector 404 would select some number of high order bits. The LSB, and, some number of additional lower order bits would not ordinarily be displayed because they would be changing rapidly and carry little information of interest to the user. The counter need not be constructed entirely in a nonvolatile technology. A counter implemented in a nonvolatile technology is expected to be more expensive per bit than one implemented in a volatile technology. Suppose that the nonvolatile portion of the counter were to be updated approximately hourly, and the VCO frequency is approximately 1 megahertz. There would be approximately four billion cycles per hour. The low order 32 bit part of the counter can then be implemented in a volatile technology ($2**32=4,294,976,296$). If a 100,000 hour expected life is assumed, only 17 bits would then be required to be implemented in a nonvolatile technology. It will be appreciated by those skilled in the art that the 17 bit high order part of the counter described need not be incremented only by a simple overflow from the lower 32 bits. A closer approximation to an hourly increment of the high order part of the counter can be performed by a Boolean decode of selected bits in the lower 32 bit counter; the lower 32 bit counter then being reset.

Processor 406 in the embodiment shown in FIG. 4B is optional, and would periodically read the bits selected by selector 404. Processor 406 would not need to execute the Arrhenius equation and accumulate the result, since that is effectively what VCO 402 and counter 403 do. Processor 406 can still update tables as described earlier.

In a simplest embodiment of FIG. 4B, processor 406 would be absent. Furthermore, display 405 can be electrically coupled to a single bit selected by selector 404, or perhaps be "hard wired" to the MSB itself, obviating the need for selector 404. Display 405, in such an embodiment, might be a single light, or perhaps an audio alarm. When the MSB of counter 403 (or an output of a Boolean combination of selected bits in counter 403) changes from a logic "0" to a logic "1", the light or alarm would be activated, signaling that the effective life of the product has been used up. In such a design, the number of bits in counter 403 would be set such that after a number of cycles from the VCO indicative of an effective age that exceeds the expected life of the product, the MSB would change from a logic "0" to a logic "1".

While the present invention has been described with reference to the details of the embodiments of the invention shown in the drawings, these details are not intended to limit the scope of the invention as claimed in the appended claims.

What is claimed is:

1. An apparatus that provides at least one estimated effective age of a product during the entire life of the product, comprising:

at least one sensor equipped on the product that produces data in the form of an analog voltage output that varies substantially linearly responsive to a change in temperature;

a device equipped on the product that uses said data to calculate an age acceleration factor for said product for at least one of said sensors, said device is a VCO, said VCO producing a VCO output signal having a frequency that varies substantially exponentially responsive to a linear voltage change on an input of the VCO;

at least one accumulator equipped on the product that provides the estimated effective age for said product, based upon said age acceleration factor; and a display equipped on the product capable of presenting said estimated effective age to a user of said product.

2. The apparatus of claim 1, wherein said accumulator is a counter; said counter being implemented, at least in part, in a nonvolatile or effectively nonvolatile technology, and wherein said counter is clocked by the VCO output signal.

3. The apparatus of claim 2, wherein said display is electrically coupled to selected bits of said counter.

4. An apparatus that provides at least one estimated effective age of a product comprising:

at least one sensor that provides data about an environmental condition;

a device that uses said data to calculate an age acceleration factor for said product for at least one of said sensors;

at least one accumulator that provides the estimated effective age for said product, based upon said age acceleration factor; and a display capable of presenting said estimated effective age to a user of said product;

wherein the at least one sensor includes an analog to digital conversion function, and wherein said device that uses said data to calculate an age acceleration factor is a digital processor wherein said digital processor is programmed to compute a Hallberg-Peck estimate of age acceleration.

5. A method for producing one or more estimates of effective age of a product, comprising the steps of:

sensing one or more environmental conditions;

computing an age acceleration factor for each of the environmental conditions sensed, using a model that relates the environmental condition to the age acceleration factor;

computing effective age values, using said acceleration factors;

storing said effective age values into nonvolatile storage; and displaying said effective age values to a user of said product on a display;

wherein the step of computing an age acceleration factor comprises the use of the Arrhenius equation, the Hallberg-Peck equation, or the Coffin-Manson equation.

6. A method for producing one or more estimates of effective age of a product, comprising the steps of:

sensing one or more environmental conditions;

computing an age acceleration factor for each of the environmental conditions sensed, using a model that relates the environmental condition to the age acceleration factor;

computing effective age values, using said acceleration factors;

storing said effective age values into nonvolatile storage; and displaying said effective age values to a user of said product on a display;

wherein the step of computing effective age values further comprises the steps of:

time integrating the age acceleration factor for each of the environmental conditions sensed, resulting in an effective age for the product according to each said model;

computing a normalized effective age for some or all of the effective ages by dividing the instant effective age by a wall clock age;

computing an effective life used value for some or all of the effective ages by dividing the instant effective age by a predetermined estimate of life of the product; and computing an effective life remaining value for some or all of the effective ages by subtracting said effective life used value from "1".

* * * * *